Dec. 5, 1950    J. F. CHURCH    2,532,606
PEBBLE HEATER
Filed Jan. 5, 1948
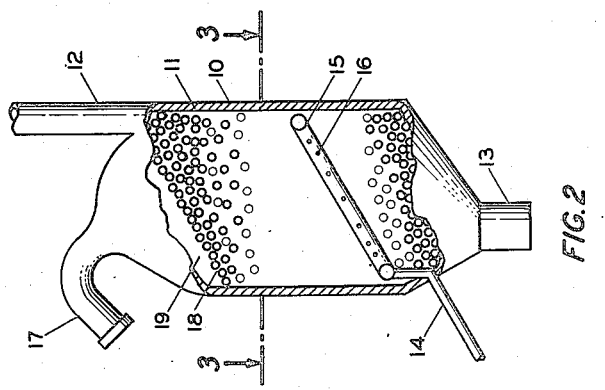
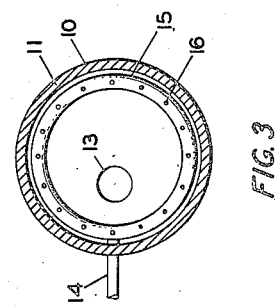
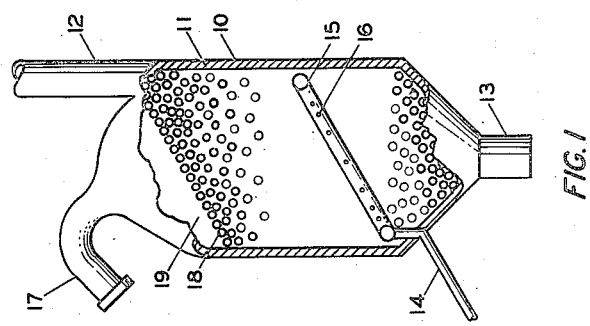
INVENTOR.
J. F. CHURCH
BY Hudson & Young
ATTORNEYS Patented Dec. 5, 1950

2,532,606

UNITED STATES PATENT OFFICE 2,532,606

PEBBLE HEATER

J. Frank Church, Bartlesville, Okla., assignor to Phillips Petroleum Company, a corporation of Delaware Application January 5, 1948, Serial No. 591

8 Claims. (Cl. 196—55)

This invention relates to improved pebble heater design and to methods for effecting improved pebble flow through a pebble heater reactor or furnace. A specific aspect of the invention pertains to an improved process for the vapor phase conversion of hydrocarbons in a pebble heater unit.

Pebble heater type apparatus is finding increasing favor in heating gases and in effecting various chemical conversion processes at elevated temperature, especially hydrocarbon conversion reactions. Pebble heater operation entails heating a descending mass of refractory pebbles in an upper heating chamber by contact with hot flue gases, allowing the hot pebbles to descend through a narrow throat (or throats) into a lower chamber wherein the hot pebbles pass usually in countercurrent contact with a stream of gas to be heated and/or reacted. The pebble stream emerges from the bottom of the reactor or furnace and flows downwardly to the lower part of a pebble elevator which elevates the pebbles to the upper end of a chute leading into the upper part of the pebble heating chamber. A pebble heater unit may include a pebble preheating chamber positioned above the pebble heating chamber wherein the pebbles are preheated by contact with the reaction effluent from the reactor, thereby quenching the same and recovering sensible heat therefrom. Some pebble heater installations also include a pebble cooling chamber positioned below the reactor or furnace through which feed gas or other gas is passed in contact with the pebbles in order to preheat the gas and cool the pebbles before elevation.

The term "pebble" as referred to throughout the specification is defined as any particulate refractory contact material which is readily flowable through a contact chamber at high temperatures. Pebbles are preferably spherical and from about ⅛ inch to 1 inch in size, but spheres ranging in size from about ¼ to ½ inch are the most practical. Uniform shapes and sizes are preferred, but pebbles of irregular shapes and sizes are operable with less efficient results. Pebbles compacted from ceramic materials such as alumina, mullite, zirconia, thoria, periclase, synthetic and natural clays, function advantageously in different types of processes. Pebbles may also be made of metals and alloys such as iron, nickel, Monel, and inconel. Pebbles may be either catalytic or inert in the process being effected.

In a pebble heater unit of conventional design, pebbles are introduced from the pebble heating chamber into the reactor or furnace through a throat axially positioned with respect to said chamber and extending thereinto a substantial distance so as to provide a vapor collecting space above the pebble bed in this chamber. Pebbles are withdrawn from the bottom of the chamber through a funnel shaped bottom with an axial outlet. Application Serial No. 699,666 by H. J. Hepp and M. O. Kilpatrick, filed September 27, 1946, discloses an improved pebble heater reactor or furnace design with improved gas flow characteristics. It was found that in certain types of operation, particularly when effecting the conversion of hydrocarbons at temperatures of about 1500° F. and upwards, considerable carbon deposition occurred around the throat and portions of the upper part of the reaction chamber in contact with sluggish sections of the gas stream flowing through the reactor. It was found that by positioning the pebble inlet at a point near the periphery of the reactor or furnace and shaping the top closure member of the chamber so as to streamline the flow of gases therefrom, much improved gas flow characteristics were exhibited in this design. However, it has been found that the pebble flow in such a design as that described and shown in the application hereinbefore identified is non-uniform, being much faster on a rather direct path from the pebble inlet to the pebble outlet. This uneven pebble flow poses a serious disadvantage in heating gases evenly and, especially, in effecting reactions which require specific temperatures and short reaction time as is obvious to anyone skilled in the art. It is believed that the more rapid pebble flow from the pebble inlet directly to the pebble outlet can be accounted for by the fact that the pebble bed is continuously higher on the side of the bed near the pebble inlet and in addition, the downward pressure of the column of pebbles in the pebble throat leading into the furnace increases the pressure and tendency of the pebbles to flow faster downwardly from the high side of the pebble bed. It is with the improvement of pebble flow through a pebble furnace of the design referred to and the attainment of uniform flow through all sections of the pebble bed in such a furnace that this invention is concerned.

The principal object of the present invention is to provide improved and substantially uniform pebble flow through a pebble furnace or reactor having a pebble inlet near the periphery of the furnace.

A further object is to provide an improved pebble heater furnace design.

Another object is to provide an improved process for effecting the conversion of hydrocarbons in a pebble heater reactor.

Other objects and purposes of the invention will become apparent from a consideration of the accompanying disclosure.

For a more complete understanding of the invention, reference may be had to the drawing of which:

Figure 1 is an elevational view, partially in section, of one modification of the improved pebble heater reactor or furnace disclosed in the copending application referred to hereinabove.

Figure 2 is a similar view, partially in section, of a pebble heater furnace or reactor illustrating one embodiment of the present invention.

Figure 3 is a cross-section of the apparatus of Figure 2 taken on the line 3—3.

The figures of the drawing are diagrammatic only.

Referring to Figure 1, 10 is a cylindrical furnace or reactor having a metal shell and a refractory lining 11. The refractory lining may comprise a series of layers of refractories and insulating material with super-refractories in the inner layer and less expensive refractories in the outer layer or layers. The reactor has a pebble inlet throat or conduit 12, a pebble outlet 13 axially positioned with respect to the reactor and a top closure member converging into gas outlet 17. The apparatus includes gas inlet means 14 connected to a gas distributor ring 15 having perforations 16 therein for the distribution of feed gas in pebble bed 18. Distribution ring 15 is positioned obliquely within the reactor 10 and generally parallel to the top of pebble bed 18 so that gases flowing through the bed have the same length path in the various sections of the pebble bed. The space between distribution ring 15 and the inner wall of the furnace should be at least four or five pebble diameters in order to permit free flow of pebbles therethrough. Numeral 19 refers to a gas collecting space above the pebble bed which is streamlined and converging into gas outlet 17 so as to avoid eddy currents and sluggish gas flow which results in uneven heating and also carbon deposition on the walls of the chamber when converting hydrocarbons.

In operation of the apparatus shown in Figure 1, a column of hot pebbles at a temperature of at least 100° F. above reaction temperature (or the temperature to which the feed is to be heated) is introduced through inlet 12 into furnace 10 and disperses in a solid, contiguous mass to form a bed 18 flowing downwardly and converging into outlet 13. Any suitable gas to be heated and/or reacted is introduced through line 14 to ring 15 from which the gas is distributed in any suitable direction such as inwardly and upwardly through openings 16. The feed gas thus introduced to the hot pebble bed passes upwardly through the bed in heat exchange relation therewith and is collected in vapor space 19 and outlet 17 for passage to any desirable use or further treatment. Any other suitable gas distribution means may be used in conjunction with the furnace shown in Figure 1. If desired, the gas may be introduced through a series of openings in the conical bottom of the chamber or through the walls of the chamber from a bustle ring surrounding the same. The invention is independent of the manner of introduction of the gas feed to the furnace.

In operation of the apparatus shown in Figure 1, it has been found that the flow rate of pebbles from pebble inlet 12 down the side of the furnace adjacent the inlet and into the outlet 13 exceeds the flow rate of the pebbles through other portions of the bed, the flow down the opposite side of the bed being the most sluggish. This non-uniformity of pebble flow is responsible for non-uniformity of heating the gas feed and, when a reaction is being effected, results in non-uniform reaction and reduction in yield over that effected with uniform pebble flow.

It is found that by withdrawing pebbles from the lower part of furnace 10 nonaxially or eccentrically with respect to the cylindrical cross-section of the furnace as shown in Figures 2 and 3, more nearly uniform pebble flow through all sections of the bed is effected. Outlet 13 in Figures 2 and 3 is shown in an eccentric position with respect to the cross-section of furnace 10 and diametrically opposite inlet 12. The amount of offset from the axis of the cylindrical chamber which will effect uniform pebble flow is determined by several factors, including the height of the bed, the diameter of the bed, and the size and shape of the pebbles. The deeper the bed in relation to its width, the less the offset required and vice versa. The character of the pebbles including the size and shape, density, resistance to flow over each other, etc., will determine the slope of the pebble bed from the point of introduction to the opposite side of the chamber. This in turn will affect the amount of eccentricity required in the pebble outlet. In general, the greater the slant of the top of the pebble bed, the greater the eccentricity required to correct the nonuniform flow of pebbles through the bed. Offsetting the pebble outlet between $1/100$ and $1/6$ the diameter of the pebble bed, depending upon the furnace design and the character of the pebbles, effects improved pebble flow when the pebble inlet is positioned near the periphery of the furnace. In constructing a pebble furnace of the type shown in Figure 2, it is advantageous to design the furnace bottom in the shape of a funnel, the sides of which form an angle of at least about 50° and preferably 70° with the horizontal. However, the use of an offset outlet improves pebble flow even though the sides of the cone or funnel form an angle with the horizontal less than 50°.

The correct amount of offset in the pebble outlet combined with about 70° slope in the funnel sides, in an otherwise properly designed furnace, effects substantially uniform pebble flow through the entire cross-section of the pebble bed.

Another method of improving pebble flow through a pebble furnace having a peripheral pebble inlet (disclosed and claimed in copending application Serial No. 592, by J. Frank Church, filed January 5, 1948), is to tilt the furnace about 2° to 15° from the vertical in the direction of the pebble inlet so as to place the more sluggish section of the pebble bed more directly over the pebble outlet.

*Example*

As an illustration of the utility of the invention, when a light paraffinic stream taken from a fractionation plant overhead and having the composition shown in the table is cracked in a pebble heater reactor of a design similar to that of Figure 2 having an I. D. of 5 feet and an average pebble bed depth of 8½ feet with an 8 inch I. D. pebble outlet off-set 4 inches from an axial position diametrically opposite the pebble inlet by contact with a stream of hot ⅜ inch spherical alumina pebbles at a reaction temperature of 1800° F., an absolute pressure of 1 atmosphere, and a reaction time of 0.14 second, an effluent of the composition set forth in the table is produced.

| Component | Feed, Weight Per cent | Cracked Prods., Weight Per cent |
|---|---|---|
| $H_2$ | | 3.06 |
| $CH_4$ | 10.4 | 16.74 |
| $C_2H_2$ | | 1.15 |
| $C_2H_4$ | | 42.14 |
| $C_2H_6$ | 69.3 | 25.11 |
| $C_3H_4$ | | 0.24 |
| $C_3H_6$ | | 3.49 |
| $C_3H_8$ | 20.3 | 4.35 |
| $C_4H_8$ | | 1.94 |
| $C_4$ | | 0.83 |
| $C_5$ and heavier | | 0.95 |
| | 100.0 | 100.00 |

About 80 per cent of the propane and 64 per cent of the ethane in the feed is reacted.

The use of a pebble furnace or reactor designed according to the invention is not restricted to the conversion of hydrocarbons, but has wide application to the superheating of steam, air, nitrogen and other gases relatively nonreactive in the heater, as well as to other types of reactions which are advantageously performed at high temperatures.

The invention is applicable to any pebble furnace in which the pebbles are introduced eccentrically or nonaxially to the furnace so as to create an unsymmetrical pebble bed. The pebble inlet need not be positioned extremely eccentric, such as at the periphery of the furnace, for the invention to be effective in improving pebble flow. The invention improves pebble flow in any pebble furnace into which the pebbles are introduced at any degree of eccentricity to the axis of the furnace but the greatest improvement is effected where eccentricity of the pebble inlet is greatest.

Various modifications of the invention not described will become apparent to those skilled in the art. The illustrative details disclosed are not to be construed as imposing unnecessary limitations on the invention.

I claim:

1. A heating chamber for heating gas to elevated temperatures by direct contact with a descending stream of hot refractory pebbles which comprises a vertically elongated, closed, cylindrical vessel; pebble inlet means for continuously introducing a column of hot pebbles downwardly into the upper portion of said vessel at the juncture of the side and the top thereof; gas inlet means in the lower portion of said vessel; gas outlet means in the upper portion of said vessel; and pebble outlet means in the bottom of said vessel disposed eccentrically in relation to said vessel and diametrically opposite said pebble inlet means, the eccentricity being in the range of $1/100$ to $1/6$ of the inside diameter of said vessel so as to provide relatively uniform flow of pebbles downwardly through all sections of said vessel.

2. A heating chamber for heating gas to elevated temperatures by direct contact with a descending stream of hot refractory pebbles which comprises a vertically elongated, closed, cylindrical vessel; pebble inlet means for continuously introducing a column of hot pebbles downwardly into the upper portion of said vessel at a point nearer the periphery of said vessel than the vertical axis thereof; gas inlet means in the lower portion of said vessel; gas outlet means in the upper portion of said vessel formed by gradually converging the top closure member into a take-off conduit adjacent the center of said member; and pebble outlet means in the bottom of said vessel disposed on the opposite side of said axis from said pebble inlet means a distance in the range of $1/100$ to $1/6$ of the inside diameter of said vessel which compensates for the eccentricity of said pebble inlet so as to provide maximum uniformity of pebble flow through said vessel.

3. A conversion chamber for continuously heating and reacting a gaseous material by direct contact with a descending stream of hot refractory pebbles which comprises a cylindrical-walled elongated, upright, closed vessel; a pebble inlet disposed near the juncture of the vertical wall of said vessel with the top closure member thereof; a bottom closure member converging conically downwardly to a pebble outlet positioned eccentrically with respect to said vessel and diametrically opposite said pebble inlet, the eccentricity being in the range of $1/100$ to $1/6$ of the inside diameter of said vessel so as to effect substantially uniform flow of pebbles downwardly from all portions of the upper portion of said pebble bed; gas inlet means in the lower portion of said vessel; and gas outlet means in the upper portion of said vessel.

4. A conversion chamber for continuously heating and reacting a gaseous material by direct contact with a descending stream of hot refractory pebbles which comprises a cylindrical-walled elongated, upright, closed vessel; a pebble inlet disposed at the juncture of the vertical wall of said vessel with the top closure member thereof; a bottom closure member in the form of a truncated oblique cone extending downwardly into a pebble outlet, the eccentricity of said outlet being diametrically opposite said pebble inlet and in the range of $1/100$ to $1/6$ of the inside diameter of said vessel; gas inlet means in the lower portion of said vessel; and gas outlet means in the upper portion of said vessel.

5. In a process for heating a gas comprising continuously gravitating a contiguous mass of hot pebbles through a cylindrical zone in contact with a stream of gas to be heated, continuously introducing pebbles in a contiguous stream to the upper part of said zone at a point near the periphery thereof and withdrawing same through a funnel shaped bottom on the lower side of said zone, wherein pebble flow through said zone is most rapid on a direct path from the point of introduction of same to the point of withdrawal thereof, the method of effecting more nearly uniform flow of pebbles through all sections of said zone which comprises withdrawing pebbles from said zone through an outlet disposed eccentrically with respect to said cylindrical zone in the range of $1/100$ to $1/6$ of the inside diameter of said vessel and diametrically opposite the point of introduction of said pebbles.

6. In a process for heating a gas comprising continuously passing a contiguous mass of hot pebbles downwardly through a cylindrical zone in contact with a stream of gas to be heated, continuously introducing said pebbles to the upper part of said zone at a point near the periphery thereof and withdrawing same through a funnel shaped bottom on the lower side of said zone, wherein pebble flow through said zone is most rapid on a direct path from the point of introduction of same to the point of withdrawal thereof, the method of improving the flow of pebbles through said zone which comprises withdrawing pebbles therefrom at a point eccentric with respect to said zone in the range of $1/100$ to $1/6$ of the inside diameter of said vessel and diametrically opposite said point of introduction so as to compensate for faster pebble flow down the inlet side of said zone.

7. In a process for effecting vapor phase conversion of hydrocarbons comprising continuously contacting a contiguous downwardly flowing mass of hot pebbles in an enclosed zone of cylindrical horizontal cross-section with a stream of hydrocarbon vapor under conversion conditions of time, pressure, and temperature so as to effect conversion thereof, wherein said pebbles are introduced to the upper portion of said zone at a point contiguous the periphery thereof and are withdrawn from said zone axially thereto, thereby effecting more rapid pebble flow down the inlet side of said zone with concomitant non-uniform heating and conversion of said hydrocarbon, the method of effecting improved pebble flow and hydrocarbon conversion comprising continuously withdrawing pebbles from said zone at a point eccentric thereto in the range of $1/100$ to $1/8$ of the inside diameter of said vessel and diametrically opposite said point of introduction.

8. In a process for effecting vapor phase conversion of hydrocarbons comprising continuously contacting a contiguous downwardly flowing mass of hot pebbles in an enclosed zone of cylindrical horizontal cross-section with a stream of hydrocarbon vapor under conversion conditions of time, pressure, and temperature so as to effect conversion thereof, wherein said pebbles are introduced to the upper portion of said zone at a point contiguous the periphery thereof and are withdrawn from said zone axially thereto, thereby effecting more rapid pebble flow down the inlet side of said zone with concomitant non-uniform heating and conversion of said hydrocarbon, the method of effecting improved pebble flow and hydrocarbon conversion comprising continuously withdrawing pebbles from said zone at a point eccentric thereto and diametrically opposite said point of introduction, the amount of eccentricity being in the range of about $1/100$ to $1/8$ of the diameter of said zone.

J. FRANK CHURCH.

REFERENCES CITED

The following references are of record in the file of this patent:

UNITED STATES PATENTS

| Number | Name | Date |
|---|---|---|
| 1,146,363 | Statham | July 13, 1915 |
| 2,429,359 | Kassel | Oct. 21, 1947 |
| 2,444,128 | Anderson | June 29, 1948 |